United States Patent [19]
Satou

[11] Patent Number: 5,285,404
[45] Date of Patent: Feb. 8, 1994

[54] DEVICE FOR CHECKING DECIMAL DATA
[75] Inventor: Yasuhiro Satou, Ibaragi, Japan
[73] Assignee: NEC Corporation, Tokyo, Japan
[21] Appl. No.: 77,736
[22] Filed: Jun. 18, 1993
[30] Foreign Application Priority Data
Jun. 18, 1992 [JP] Japan .................................. 4-159022
[51] Int. Cl.⁵ ............................................ G06F 11/00
[52] U.S. Cl. .................................................... 364/737
[58] Field of Search ............................... 364/737-739
[56] References Cited
U.S. PATENT DOCUMENTS
3,963,907 6/1976 Durand-Vienne .................. 364/737
4,534,059 8/1985 Yamada .......................... 364/737 X Primary Examiner—Tan V. Mai
Attorney, Agent, or Firm—Foley & Lardner

[57] ABSTRACT

A device for checking decimal data includes a command analyzing circuit which analyzes the content of a main storage command register and a data register for storing data read from a main storage unit via a system bus, a decimal data format checking circuit for checking the decimal format of the read-out data by the output of the command analyzing circuit, a check result register for storing the check result, an arithmetic operation unit into which data necessary for the arithmetic operation are entered from the data register and the decimal format check result from the check result register for arithmetic operation. Therefore, the speed of processing is increased, since data can be loaded while the decimal data format is also checked.

3 Claims, 4 Drawing Sheets

FIG.3(a)

PACKED FORMAT
OPERAND LENGTH : 32 BITS

| 0:4 | 4:4 | 8:4 | 12:4 | 16:4 | 20:4 | 24:4 | 28:4 |
|-----|-----|-----|------|------|------|------|------|
| >9  | >9  | >9  | >9   | >9   | >9   | >9   | ≤9   |

NUMERIC CHARACTER — LETTER

FIG.3(b)

UNPACKED FORMAT
OPERAND LENGTH : 32 BITS

| 0:4 | 4:4 | 8:4 | 12:4 | 16:4 | 20:4 | 24:4 | 28:4 |
|-----|-----|-----|------|------|------|------|------|
|     | >9  |     | >9   |      | >9   | ≤9   | >9   |

LETTER — LETTER — NUMERIC CHARACTER — LETTER

DEVICE FOR CHECKING DECIMAL DATA

BACKGROUND OF THE INVENTION

The present invention relates to a device for checking decimal data in a data processing system.

A conventional decimal data checking device, as shown in FIG. 1, comprises a main storage command register 1 for storing various commands such, for example, as a read/write command or the like, a command analyzing circuit 2 for analyzing these commands, a data register 4 for storing the data read from the main storage unit and a circuit 3 for checking the decimal format of the data supplied from the data register 4. In the known circuit, the command from the main storage command register 1 is analyzed in the command analyzing circuit 2 and the data necessary for a desirable arithmetic operation are sent via a system bus 7 to the data register 4.

Upon execution of a desired arithmetic operation, necessary data are read out from the data register 4 to check in the decimal data format checking circuit 3. If no format error is found in the checking operation, then the data are used for the arithmetic operation conducted in the arithmetic operation unit 5 using those data. However, if there is any format error or the like in the data, then, as an exceptional processing, the data are read again into the data register 4 via the system bus 7.

As described above, in the conventional decimal data checking device, the data read from the main storage unit is read into the data register once before the necessary data is checked in the decimal data format checking circuit 3. If there is no error in it, then an arithmetic operation is carried out in the arithmetic operation unit 5 and, if yes, then it is not carried out. In consequence, when the arithmetic operation is done, the quality of the data format which is read from the data register 4 cannot be determined. This means that, prior to the arithmetic operation, it is necessary to arithmetically operate after it is confirmed in the decimal data format checking circuit 3 that there is no error in the decimal data format checking circuit 3, which can delay the processing speed until the arithmetic operation is actually conducted after the data necessary for the arithmetic operation is read out.

SUMMARY OF THE INVENTION

An object of the present invention is to provide a decimal data checking circuit which enables to increase processing speed.

According to the present invention, there is provided a decimal data checking device used in a data processing system which handles decimal data, comprising:

a main storage command register for storing information obtained from a main storage device;

a command analyzing circuit for analyzing the content of said main storage command register;

a decimal data format checking circuit for checking the decimal data format of the data read out from said main storage according to a decimal data check indication emitted from said command analyzing circuit;

a check result register for storing the output result of said decimal data format checking circuit;

a data register for simultaneously entering said data read from said main storage simultaneously with said decimal data format checking circuit for storage; and an arithmetic operation unit for entering a data necessary for the arithmetic operation and for entering the decimal data format check result from a check result register for arithmetic operation.

Therefore, the decimal data checking device according to the present invention can store the data read out from the main storage unit into the data register, while at the same time reading into the decimal data format checking circuit for checking, so that it is possible to determine the validity of the read-out data more promptly thereby to increase processing speed until the arithmetic operation is conducted on the data after they are read out.

In a preferred embodiment of the present invention, the decimal data format checking device determines the data as incorrect if it is represented by numerical codes and is greater than nine (9), and determines it as incorrect if it is represented by sign codes and is smaller than nine for checking the decimal data format.

That is, the decimal data checking device according to the present invention, the data read out from the main storage are stored into the data register while at the same time checking in the decimal data format checking circuit to store the check result into the check result register, and when any arithmetic operation is conducted, references to the check result for arithmetic operation. Therefore, the circuit of the present invention has an advantage that the processing speed until the arithmetic operation is conducted after the data is read out can be increased.

The present invention will be more clearly understood from the following detailed description with reference to the accompanying drawings.

BRIEF DESCRIPTION OF THE DRAWINGS

FIGS. 3(a) and 3(b) are diagrams each showing data format to be checked by the decimal data checking device of the present invention.

DETAILED DESCRIPTION OF THE PREFERRED EMBODIMENTS

Figure 1:
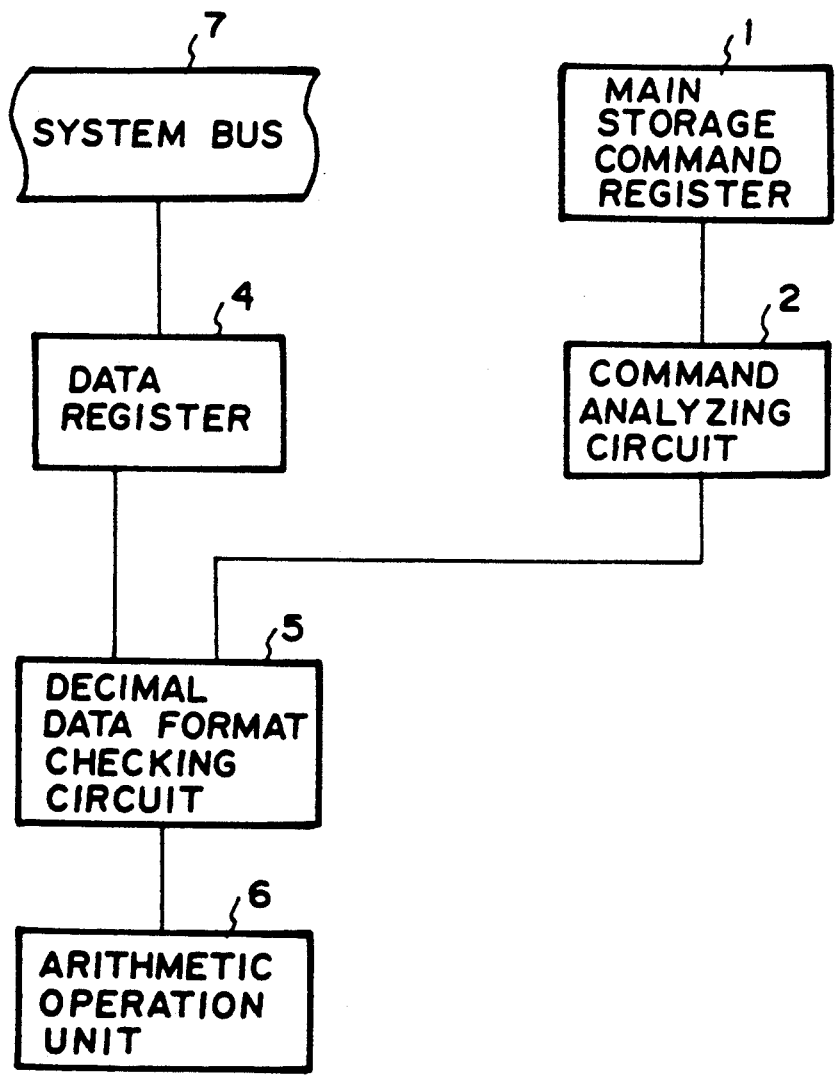
FIG. 1 is a block diagram of a conventional decimal data checking device.
Figure 2:
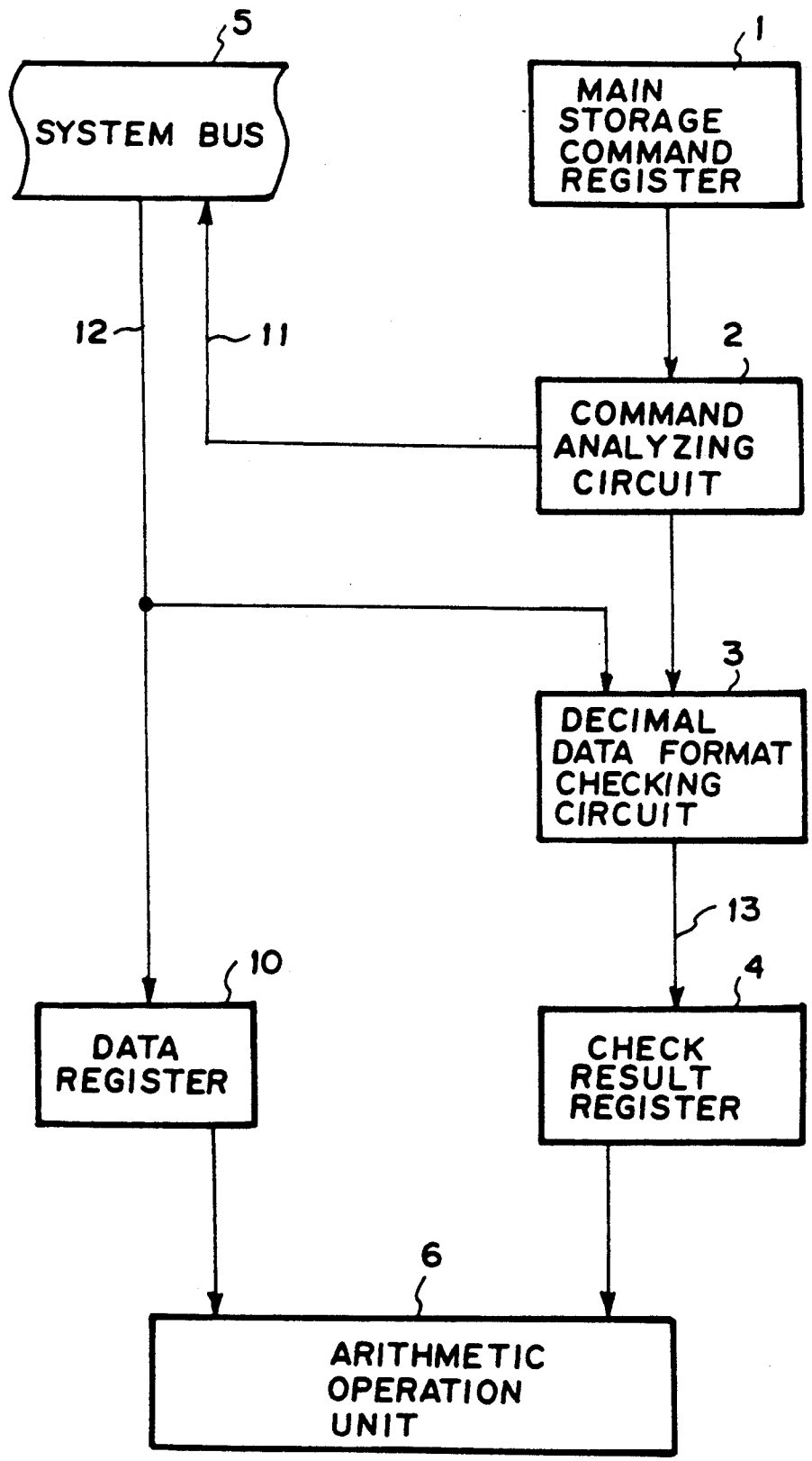
FIG. 2 illustrates a block diagram of a decimal data checking device embodying the present invention.

Referring now to the drawings, particularly to FIG. 2 which illustrates a decimal data checking device of the present invention, reference numeral 1 depicts a main storage command register, 2 a command to a command analyzing circuit, 3 a decimal data format checking circuit, 4 a data register, 5 an arithmetic operation unit, and 7 a system bus.

The input of the command analyzing circuit 2 is connected to the main storage command register 1 through the signal line depicted at 11, and the output thereof is connected to the input of the decimal data format checking circuit 3, to which the system bus 7 is also connected via a data line 12.

The output of the decimal data format checking circuit 3 is connected to a check result register 6 via a signal line 13. To the arithmetic unit 5 are supplied data from the check result register and the data register 4.

The main storage command register 1 stores the information and supplies a command to the command analyzing circuit 2 which analyzes the supplied command with reference to the output of the main storage command register 1, and generates the result of analysis to the decimal data format checking circuit 3. Simultaneously, the circuit 2 supplies a command to the system bus 7 via the signal line 11 according to the analyzed information.

Data read from the main storage (not shown) in accordance with a command from the outside are supplied through the system bus 7 to the data register 4 via the data line 12 and, simultaneously, to the decimal data format checking circuit 3.

Data register 4 stores the data from the system bus 7 and delivered to the arithmetic operation unit 5. On the other hand, the decimal data format checking circuit 3 carries out checking of the decimal format, with the decimal check indicating signal emitted from the command analyzing circuit 2 and the data emitted via the data line 12 as inputs, and supplies the signal showing the result of checking to the check result register 6.

The check result register 6 operates to store the signal showing the result of decimal checking from the decimal data format checking circuit 3 and supplies the signal to the arithmetic operation unit 5, to which the data from the data register 4 and the decimal check result from the check result register 6, respectively, for arithmetic operation.

The operation of the decimal data checking device of present invention will be described below.

First, the command analyzing circuit 2 analyzes the command read from the main storage command register 1 and decides whether the data are a read instruction with decimal formal being checked or not. When the data are determined that it be a read instruction with decimal format checked, a decimal check indicating signal for checking the decimal data format is supplied to the decimal data format checking circuit 3. At the same time, a read instruction is generated to the system bus 7 via the signal line 11.

The main storage unit, upon receipt of the read instruction from the command analyzing circuit 2, the main storage unit supplies data to the system bus 7, with the data being sent to the data register 4 and the decimal data format checking circuit 3 via the data line 12.

The decimal check indicating signal is entered to the decimal data format checking circuit 3 from the command analyzing circuit 2 so that the decimal formal of the data is checked in the decimal data format checking circuit 3.

FIG. 3(a) illustrates, by way of example of the decimal data formats in a packed formal of which an operand lenght is 32 bits; and FIG. 3(b) illustrates decimal data formats in an unpacked format. In case that the data are a numeric character code, the checking circuit 3 recognizes to be correct when the code is comprised of numeric characters ranging from "0" to "9", but to be incorrect when the code is comprised of letter code from "A" to "F".

In the case of letter codes, on the other hand, a code comprising letter ranging from "A" to "F" is recognized to be correct, but a code comprising the numeric characters ranging from "0" to "9" is to be incorrect.

The foregoing check condition is also true to a packed format representing two numbers as well as an unpacked format (or zone format) representing a single number.

Figure 4:
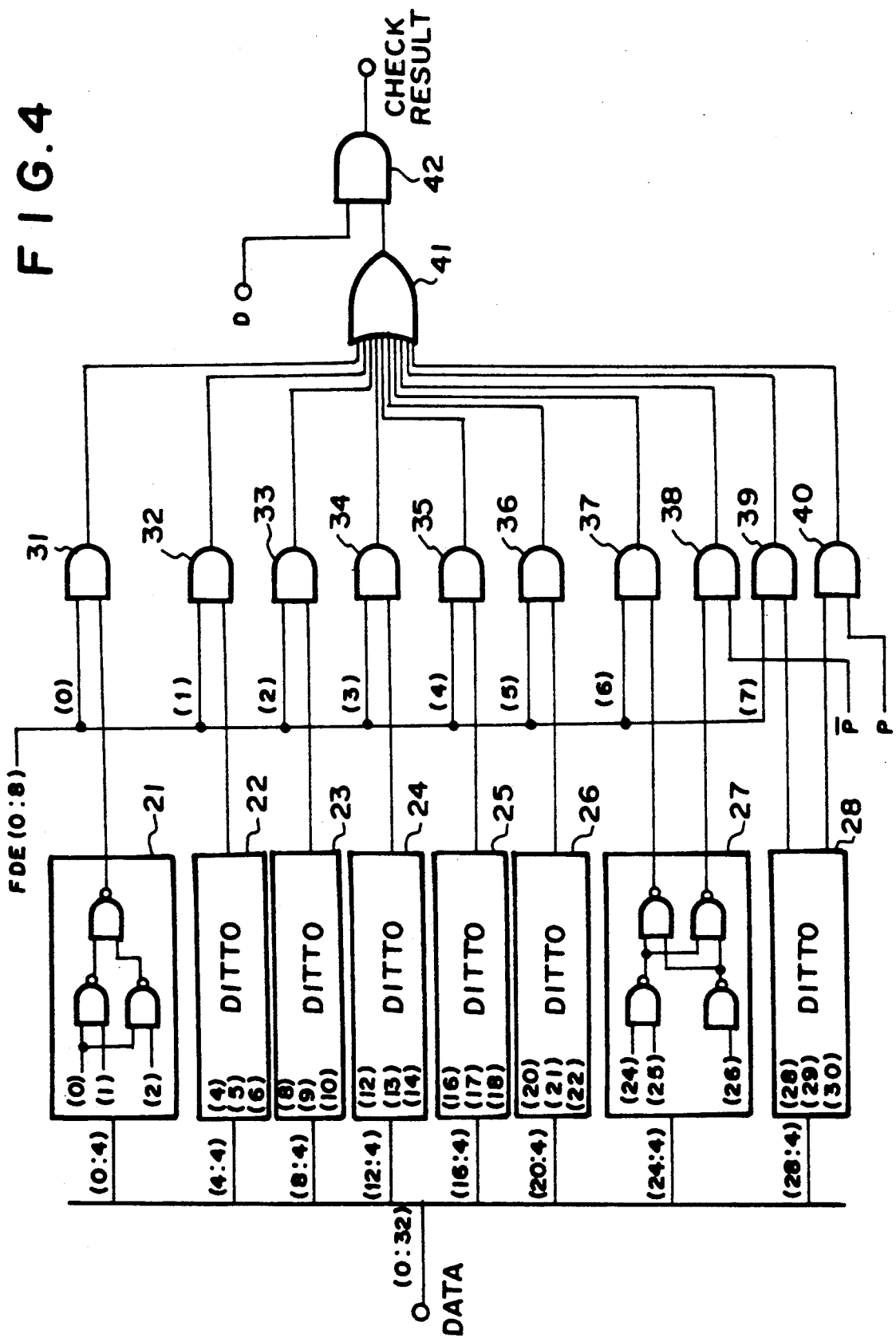
FIG. 4 is a detailed circuit diagram of the decimal data format checking circuit used in the device shown in FIG. 2.

An example of a detailed circuit diagram of the decimal data format checking circuit 3 is illustrated in FIG. 4. The circuit comprises logic units 21–28 each including NAND circuits and AND circuit and corresponding to the entered numeric codes and the sign codes, AND circuits 31–40, an OR circuit 41 and an AND circuit 42 connected together as illustrated in FIG. 4.

The data to be checked are supplied to the inputs of the logic units 21–28, and the output thereof are connected to the inputs of the AND circuits 31–40, where selection is conducted in accordance with FDE and P-bits. The outputs of the AND circuits 31–40 are connected to the OR circuit 41 and fetched through the AND circuit 42 as data showing the result of checking under control of D bit.

If the input data is determined by the decimal data format checking circuit 3 that there be no incorrectness, then "0" is generated, and if there is any incorrectness, then "1" is emitted as the check result to the check result register 6 via the check result signal line 13.

Thereafter, a predetermined arithmetic operation is carried out, and then a necessary data is entered from the data register 5. A necessary decimal format check result is entered from the check result register 6 for arithmetic operation. However, when the decimal data format from the check result register 6 is incorrect, any arithmetic operation using that data is not carried out, but an exceptional processing is executed.

What is claimed is:

1. A decimal data checking device used in a data processing system which handles decimal data, comprising:
   a main storage command register for storing information obtained from a main storage device;
   a command analyzing circuit for analyzing the content of said main storage command register;
   a decimal data format checking circuit for checking the decimal data format of the data read out from said main storage according to a decimal data check indication emitted from said command analyzing circuit;
   a check result register for storing the output result of said decimal data format checking circuit;
   a data register for simultaneously entering said data read from said main storage simultaneously with said decimal data format checking circuit for storage; and
   an arithmetic operation unit for entering a data necessary for the arithmetic operation and for entering the decimal data formal check result from a check result register for arithmetic operation.

2. The device according to claim 1 wherein said decimal data format checking circuit determines that numeric data be incorrect when the data are greater than 9.

3. The decimal data checking device according to claim 1 wherein said decimal data format checking circuit determines that sign codes be incorrect when the data are smaller than 9.

* * * * *